United States Patent
Shaffer et al.

(10) Patent No.: US 6,205,153 B1
(45) Date of Patent: Mar. 20, 2001

(54) SYSTEM AND METHOD FOR IMPROVING CSMA/CD NETWORK PERFORMANCE DURING COLLISIONS

(75) Inventors: Shmuel Shaffer, Palo Alto; William J. Beyda; Harry Yen, both of Cupertino; Charles Marcus White, San Jose, all of CA (US)

(73) Assignee: Siemens Information and Communications Systems, Inc., Boca Raton, FL (US)

( * ) Notice: Subject to any disclaimer, the term of this patent is extended or adjusted under 35 U.S.C. 154(b) by 0 days.

(21) Appl. No.: 08/853,281

(22) Filed: May 9, 1997

(51) Int. Cl.[7] .................................................. H04L 12/413
(52) U.S. Cl. ........................ 370/445; 370/235; 709/238; 709/253
(58) Field of Search ..................................... 370/431, 445, 370/446, 447, 448, 235, 236; 395/200.6, 200.62, 200.65, 200.68; 709/253, 232, 238

(56) References Cited

U.S. PATENT DOCUMENTS

| | | |
|---|---|---|
| 4,063,220 | 12/1977 | Metcalfe et al. . |
| 4,464,658 | 8/1984 | Thelen . |
| 4,584,679 * | 4/1986 | Livingston et al. .................. 370/448 |
| 4,598,285 | 7/1986 | Hoshen . |
| 4,630,264 | 12/1986 | Wah et al. . |
| 4,965,792 | 10/1990 | Yano . |
| 5,018,138 | 5/1991 | Twitty et al. . |
| 5,268,899 | 12/1993 | Brown . |
| 5,319,641 | 6/1994 | Fridrich et al. . |
| 5,353,287 | 10/1994 | Kuddes et al. . |
| 5,381,413 | 1/1995 | Tobagi et al. . |
| 5,398,244 | 3/1995 | Mathews et al. . |
| 5,418,784 | 5/1995 | Ramakrishnan et al. . |
| 5,422,887 | 6/1995 | Diepstraten et al. . |
| 5,436,903 | 7/1995 | Yang et al. . |
| 5,446,735 | 8/1995 | Tobagi et al. . |
| 5,526,355 | 6/1996 | Yang et al. . |
| 5,692,127 * | 11/1997 | Devon ............................. 395/200.06 |
| 5,790,603 * | 8/1998 | Maeda et al. ........................ 375/342 |
| 5,854,700 * | 12/1998 | Ota ....................................... 359/136 |

* cited by examiner

*Primary Examiner*—Ajit Patel
*Assistant Examiner*—Bob A. Phunkulh

(57) ABSTRACT

A network node 102 capable of detecting how many parties have collided during attempts to transmit on a bus 108. If more than one party has been detected to collide, the node 102 selects a backoff window from a larger randomized group of possible backoff windows than if the node had collided with only one other party. In this way, delays due to multiple parties colliding are minimized.

23 Claims, 3 Drawing Sheets

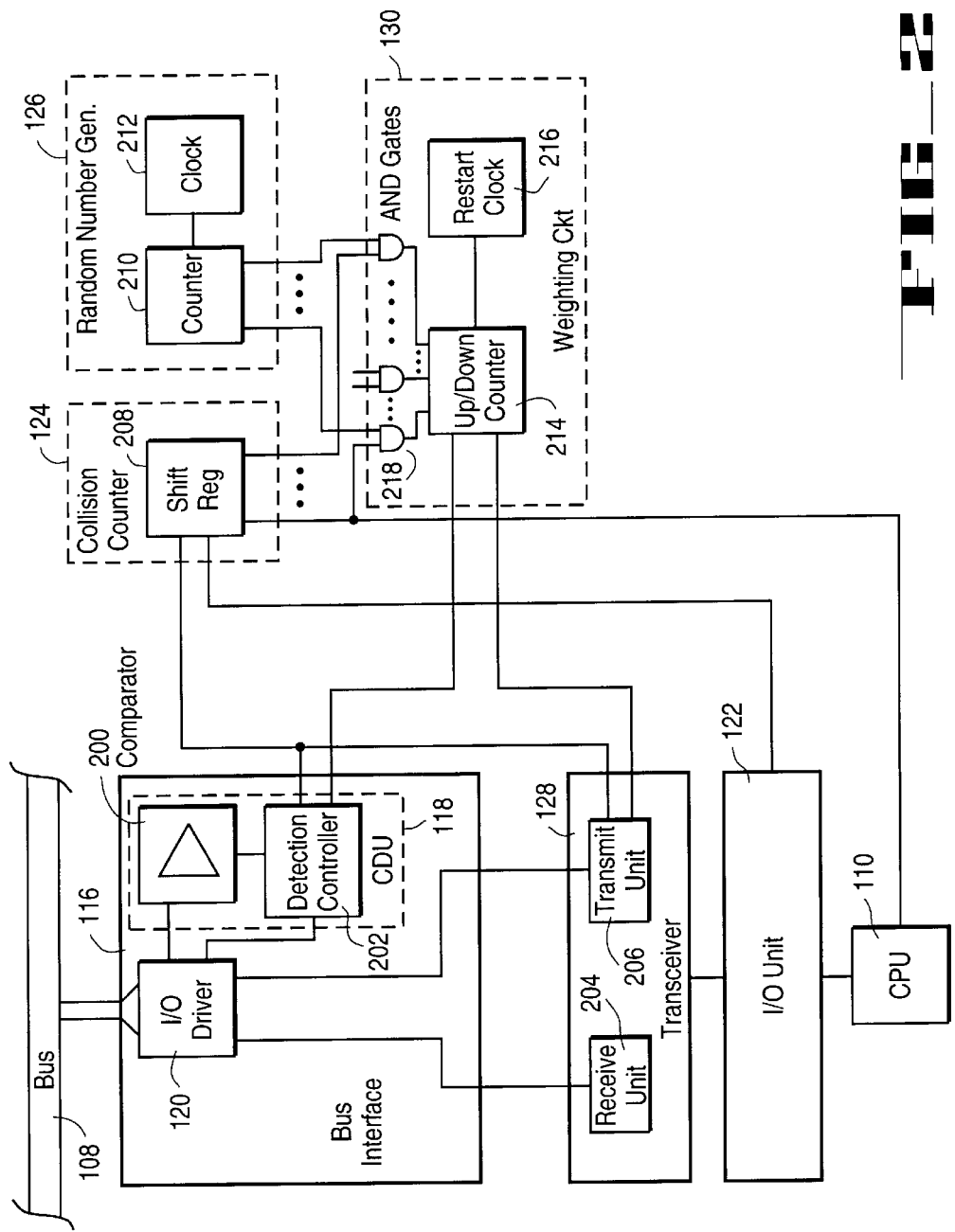
FIG_2

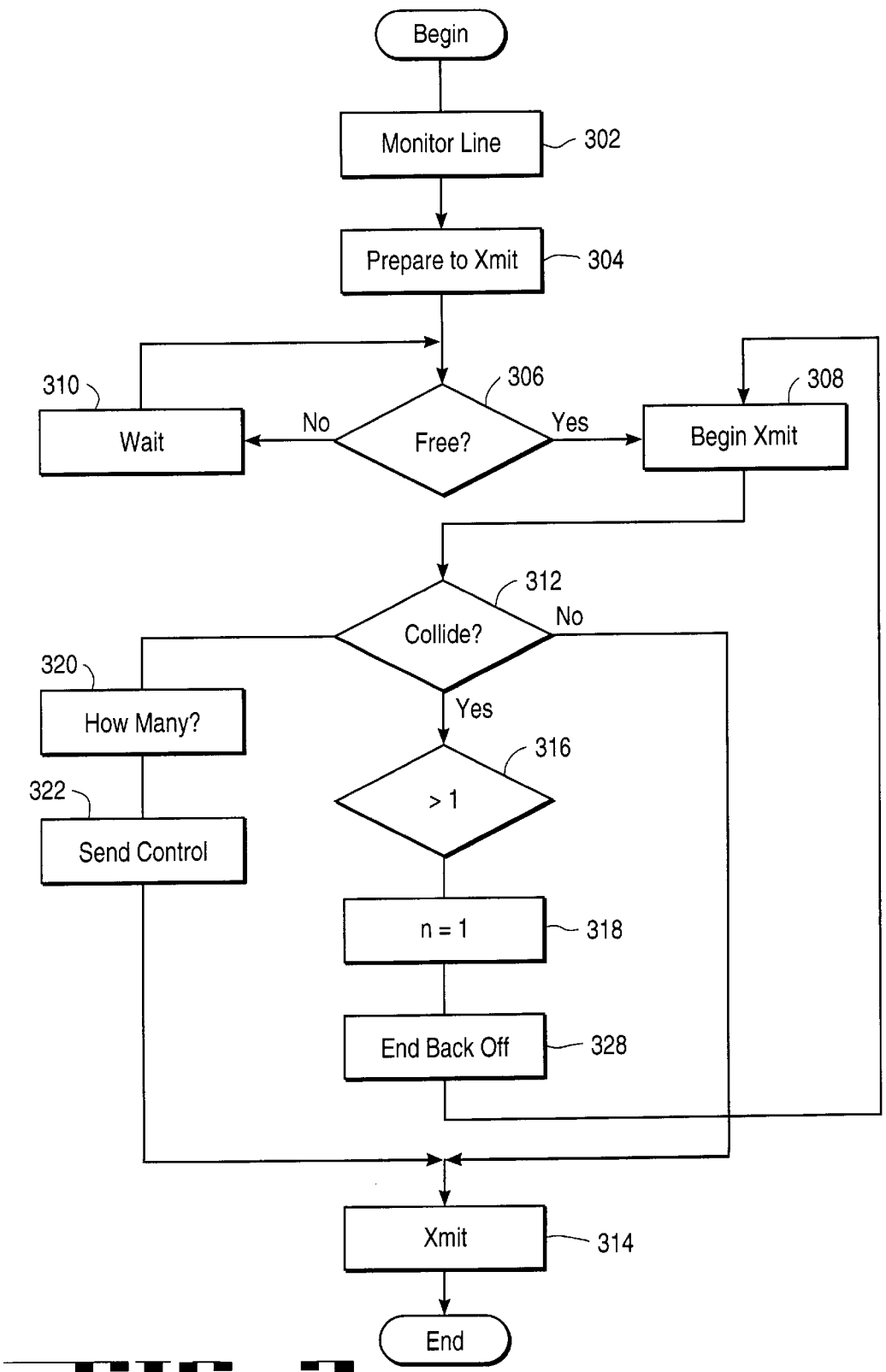
FIG_3

SYSTEM AND METHOD FOR IMPROVING CSMA/CD NETWORK PERFORMANCE DURING COLLISIONS

BACKGROUND OF THE INVENTION

This invention relates to a network access protocol known as Carrier Sense Multiple Access with Collision Detection (CSMA/CD) and, more particularly, to a method for improving network performance when multiple parties collide in such a network.

The CSMA/CD protocol, generally used in Ethernet LANs (local area networks), is defined in ANSI/IEEE Standard 802.3 published by the Institute of Electrical and Electronics Engineers (hereinafter, the "IEEE 802.3 standard").

Under the CSMA/CD rules for access to a network bus or cable, any node or station wishing to transmit must first listen to ensure that the channel is clear before beginning to transmit. All nodes on the network have equal priority of access and may begin transmitting as soon as the channel is clear and a required interpacket delay of 9.6 microseconds has elapsed. However, if a first node that has begun transmitting detects a collision with a transmission from another node, the first node continues transmitting for a short time to make sure that all nodes wishing to transmit will detect the collision (it is assumed that, while the attempts to transmit are nearly simultaneous, the first node is actually the first to begin). Every other node detecting the collision also continues to transmit for a short time. Then each node that has detected a collision terminates transmission of the packet or frame. The nodes involved in the collision then wait for the required interpacket delay of 9.6 microseconds and then select random and therefore usually different delay times, referred to backoff times, before attempting to transmit their packets again. As used herein, "collision" refers to the condition in which two or more nodes attempt to transmit nearly simultaneously after detecting the bus is clear.

The IEEE 802.3 standard defines a collision backoff procedure referred to as "truncated binary exponential backoff." When a transmission attempt has terminated due to a collision, it is retried by the transmitting node after a selected backoff time until either the transmission is successful or a maximum number of attempts have been made and all have terminated due to collisions. The backoff time is selected by each node as an integral multiple of the "slot time" which is the maximum round trip propagation time for the network, i.e., the time required to propagate a data packet from one end of the network to the other and back. The slot time is defined by the IEEE 802.3 Standard as 51.2 microseconds. The number of slot times selected as the backoff time before the nth retransmission is chosen as a randomly distributed integer r in the range:

$$0 \leq r \leq 2^k, \text{ where } k=\min(n, 10).$$

Therefore, for the first attempted retransmission, the backoff time is selected as 0 or 1 slot times. For the second attempted retransmission the backoff time is selected as 0, 1, 2 or 3 slot times. For the third attempted retransmission, the backoff time is selected as 0, 1, 2, 3, 4, 5, 6 or 7 slot times and so on, up to a maximum backoff time of up to 1,023 slot times or 52.4 milliseconds. The backoff-time retransmission attempt number relationships are set forth in Table 1 below.

TABLE 1

| Retransmission Attempt No. n | Backoff Time in Slot Times r |
|---|---|
| 1 | 0,1 |
| 2 | 0,1,2,3 |
| 3 | 0,1,2,3,4,5,6,7 |
| 4 | 0–15 |
| n | $0–(2^n - 1)$ |
| 10 (max n) | 0–1023 |

As can be appreciated, if two parties collide there is a fifty percent chance that the parties will take the same transmission window on the first retransmission attempt. There is similarly a fifty percent chance that they will pick different transmission windows. On the second retransmission attempt, the wider range of numbers makes the chances of colliding on each of the attempts progressively smaller.

If, however, a collision occurs between more than two parties, there is a greater likelihood that the collision will occur again on the second attempt. For example, if nodes A, B and C collide, node A will pick a number X on its first retransmission attempt. There is a fifty percent chance that node B will pick the same number X, and a fifty percent chance that node C will pick the same number X before attempting retransmission. Thus, no matter what happens, there will be at least two parties attempting to transmit in one window, thereby increasing the chances of another collision. The possibilities for three parties colliding with a backoff window of 2 (e.g., x or y time slots) are set forth in Table 2 below:

TABLE 2

| COLLISION POSSIBILITIES: 3 PARTIES COLLIDE, BACKOFF WINDOW OF 2 | | | |
|---|---|---|---|
| PARTY | A | B | C |
| BACKOFF | X | X | X |
|  | X | X | Y |
|  | X | Y | X |
|  | X | Y | Y |
|  | Y | X | X |
|  | Y | X | Y |
|  | Y | Y | X |
|  | Y | Y | Y |

Clearly, as the number of parties colliding increase, this problem becomes worse. The developers of the IEEE 802.3 Standard and Ethernet did not efficiently handle the possibility of multiple parties colliding. At the time the IEEE 802.3 standard was developed, E-mail traffic was the prevalent LAN use envisioned. However, today's higher bandwidth graphics and multimedia traffic increase the chances of multiple parties colliding. Thus, the two-party collision is, in many cases, an unrealistic assumption. As more and more parties collide, the chances for a lockup on a network employing the IEEE 802.3 collision backoff standard increase exponentially.

A method has been developed in which backoff times in a two node collision in which one node has "captured" the system are selected to be different from those prescribed in the IEEE 802.3 standard, for example, in U.S. Pat. No. 5,436,903. In that system, backoff times are changed, for example, by selecting backoff times deterministically and then using a stopped backoff technique in which a node's backoff timer is stopped when the collision signal on the bus is active. While apparently successful at preventing node capture, the system does not address the possibility that more than two nodes might collide.

SUMMARY OF THE INVENTION

These problems in the prior art are overcome in large part by a system and method according to the present invention in which each node is configured to be able to determine how many parties have collided. If more than two parties collide, the retransmission attempt number is incremented such that a greater number of backoff times are selectable by each of the colliding nodes. Thus, for example, if three parties A, B and C collide, the parties will select from backoff times corresponding to, for example, retransmission attempt n=2, rather than backoff times based upon retransmission attempt n=1. In this manner the likelihood of a repeat collision is reduced.

According to one embodiment of the present invention an access controller monitors voltage levels on the bus. A first voltage level corresponds to a collision between two parties on the bus. A second voltage level corresponds to more than two nodes colliding for access on the bus. If the second voltage level is detected during a collision, the nodes back off and select backoff times from a backoff time window greater than that corresponding to the prescribed standard.

Briefly, the present invention relates to a network node capable of detecting how many parties have collided during attempts to transmit on a bus. If more than one party has been detected to collide, the node selects a backoff window from a larger randomized group of possible backoff windows than if the node had collided with only one other party. In this way, delays due to multiple parties colliding are minimized.

BRIEF DESCRIPTION OF THE DRAWINGS

A better understanding of the present invention is obtained when the following detailed description is considered in conjunction with the following drawings in which:

FIG. 2 is a block diagram illustrating one implementation of a transceiver and interface stage adapted for use in the system of FIG. 1; and FIG. 3 is a flow chart illustrating operation of an embodiment according to the present invention.

DETAILED DESCRIPTION OF THE INVENTION

Figure 1:
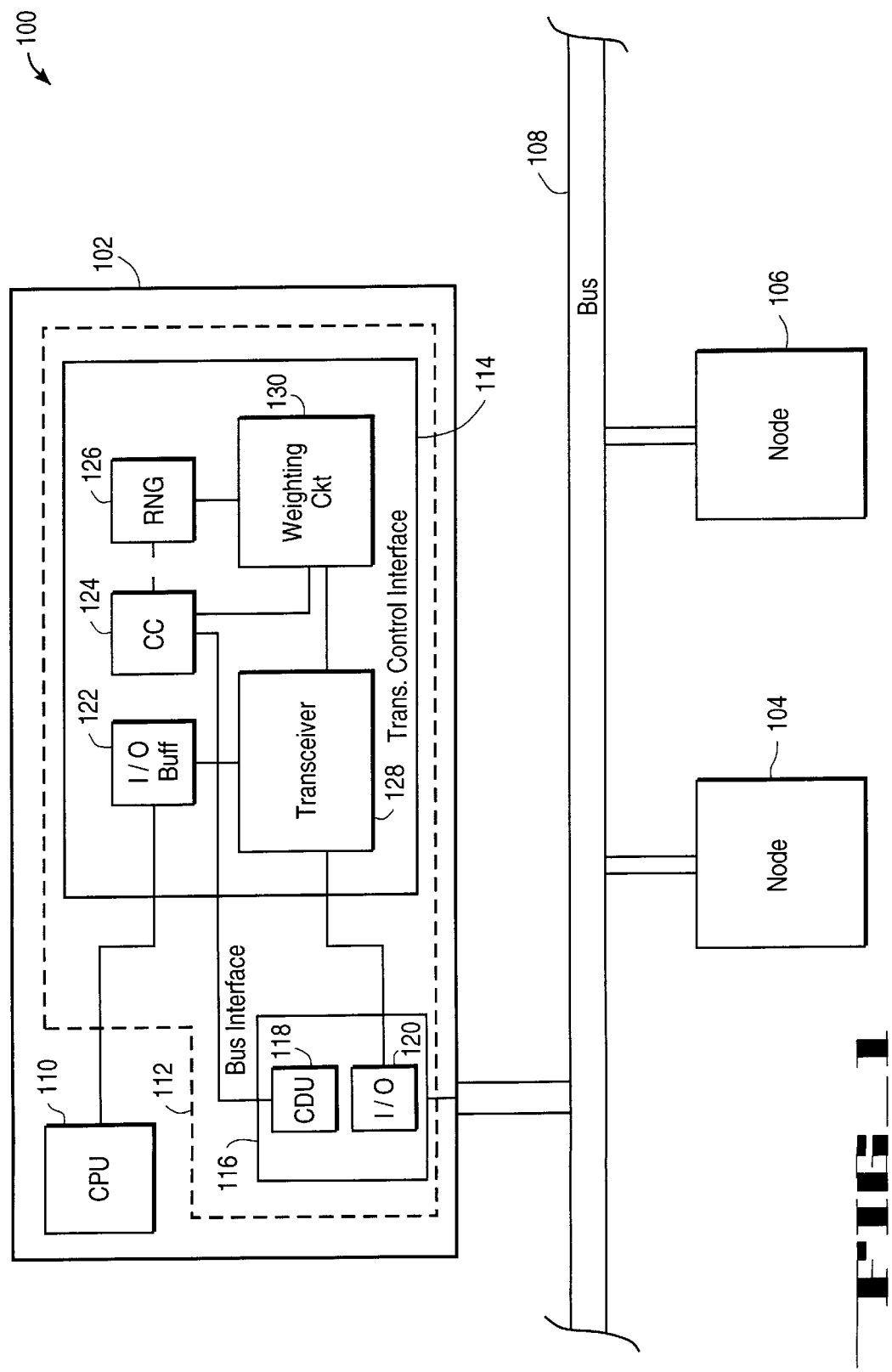
FIG. 1 is a block diagram illustrating a computer system according to one embodiment of the present invention.

Turning now to the drawings, and with particular attention to FIG. 1, a communication network is generally identified by the reference numeral 100. The communication network 100 includes a transmission medium or bus 108 which may comprise, for example, coaxial cable or unshielded twisted pair (UTP) wiring. A plurality of network devices or nodes 102, 104 and 106 are coupled to the transmission medium 108. The network devices 102, 104 and 106 comprise, for example, personal computers, printers, servers and other devices.

The invention will be described with respect to exemplary device 102. While each network device 102, 104, 106 in network 100 may be similarly configured, the present invention is operable if only one node is so configured. The network device 102 includes an exemplary network interface unit 112, such as a network interface card, coupled to a central processing unit 110. The central processing unit 110 is representative of, for example, a Pentium or Pentium Pro type processor in a personal computer. The network interface unit 112 includes a bus interface 116 coupled to a transmission control interface 114. The bus interface 116 includes I/O drivers 120 and a collision detection unit 118. As will be discussed in greater detail below, the collision detection unit 118 monitors the transmission medium 108 for the presence of data from the other network devices 104, 106 on the transmission medium 108. If the network device 102 needs to transmit data on the transmission medium 108, the collision detection unit 118 determines if the data from the network device 102 have collided with data from other the network devices 104, 106 on the transmission medium 108. If such a collision does occur, the collision detection unit 118 provides a control signal to the transmission control interface unit 114. More particularly, the transmission control interface unit 114 includes a transceiver 128 having transmitter and receiver logic (not shown). The transceiver 128 is coupled to an I/O buffer unit 122 which in turn is coupled the CPU 110. Also coupled to the transceiver unit 128 is a weighting circuit 130 which, as will be discussed in greater detail below, is used to select the appropriate retransmission window. The collision detection unit 118 is coupled to a collision counter 124 which is also coupled to the weighting unit 130. A random number generator 126 further couples the weighting unit 130 to the collision counter 124. The collision clock 124 clocks every time a collision occurs. When a packet is ready for transmission, the random number generator 126 and the weighting circuit 130 provide the determination of the randomized number of the retransmission window. This information is then provided back to the network interface 116 to permit another attempted retransmission via the I/O driver 120.

More particularly, if the network device 102 attempts to transmit, and the collision detector 118 detects a collision on the transmission medium 108, the collision detection unit 118 determines how many devices are colliding on the transmission medium 108. In one embodiment, the collision detection unit 118 monitors voltage levels on the transmission medium 108. If two devices have collided on the transmission medium 108, a first voltage will be detected by the collision detection unit 118. If more than two devices have collided on the transmission medium 108, another (larger) voltage level will be detected. This information is then provided to the collision counter 124 of the transmission control interface 114. The collision counter 124 counts how many collisions have occurred. In the case of two parties colliding, this is the number of retransmission attempts. In the case of multiple parties colliding, it may be the number of parties. The collision counter provides the retransmission attempt number to the weighting circuit 130. The weighting circuit 130 selects the backoff time in slot times based upon the random number generator 126's output. The output of the weighting circuit 130 is then the backoff time which is provided to the transceiver 128. The transceiver 128 will wait the appropriate backoff time and then pause the I/O driver 120 prior to attempting a new transmission onto the transmission medium 108.

Operation of one embodiment of the present invention is illustrated in FIG. 2. FIG. 2 illustrates in greater detail the bus interface 116 and the transmission control interface 114. It is noted that while illustrated as discrete hardware, the bus interface 116 and the transmission control interface 114 may be embodied in one or more digital signal processors (DSPs). Thus, FIG. 2 and FIG. 3 are exemplary only.

As illustrated in FIG. 2, the network control interface 116 comprises an I/O driver unit 120 coupled to a collision detection unit 118. The I/O driver unit 120 drives data to and receives data from the bus 108. The collision detection unit 118 includes a comparator 200 coupled to a detection controller 202. The comparator 200 is used to compare voltage levels on the transmission medium 108 with predetermined levels. The predetermined levels are representative of, for example, two or more than two devices colliding on the transmission medium 108. If a collision is detected during a transmission attempt, the comparator 200 provides an output to the control unit 202 indicative of the number of devices that have collided on the transmission medium 108. The detection control unit 202 then suspends transmission along the transmission medium 108 and provides a control signal to the collision counter 124. The collision counter 124 includes, for example, a shift register 208. The shift register 208 may be configured to shift every time a collision is detected. For example, in the case of one device colliding with a transmission attempt by the device 102, the shift register 208 is shifted one place. However, if the comparator 200 provides an output to the detection control unit 202 which indicates that more than one device has collided on transmission medium 108, the shift register 208 may be shifted more than one place. For example, the shift register 208 may be shifted twice.

The shift control signal is also provided to a transmission controller 206 in the transceiver 128. The transceiver 128 includes a receive unit 204, in addition to the transmission unit 206. Data are received from the CPU 110 through the I/O unit 122 and on to the transceiver 128. The data are the provided to the I/O drivers 120 and out onto the transmission medium 108.

Returning now to the case where the detection control unit 202 has provided a shift control signal to the shift register 208. The shift register 208 provides outputs to a series of AND gates 218. The other inputs to the AND Gates 218 are derived from the random number generator 126. More particularly, the random number generator 126 includes a counter 210 and a clock 212. The clock 212 is a faster clock than the system clock. The counter 210 runs as a continually running clock counter. The AND gates 218 comprise a portion of the weighting circuit 130. The weighting circuit 130 further includes an up/down counter 214 coupled to a restart clock 216. As noted above, the shift register 208 is clocked each time a collision occurs and the serial input thereof is, in turn, provided to count up the number of collisions occurring during those times when a packet is ready for transmission.

The outputs of the AND Gates 218 are connected to the inputs of the up/down counter 214, which is clocked by the restart clock 216. The up/down counter 214 is loaded by the collision detection signal to begin a down count when a collision is detected. When the count reaches zero, a signal is sent to the transmission control 206 to cause retransmission of the data packet.

A flowchart illustrating operation of one embodiment of the invention is shown in FIG. 3. In a step 302, the collision detection unit 118 or other circuitry in the bus interface unit 116 continually monitors the transmission medium 108. When the I/O driver 120 receives data which is to be transmitted from the transceiver 128, in a step 304, the collision detection unit 118 determines whether or not the transmission medium is free in a step 306. A determination that the transmission medium 108 is free includes, for example, detecting the end of another node's transmission and waiting the predetermined interpacket gap of 9.6 microseconds. If the transmission medium 108 is determined to be free, the collision detection unit 118 allows the transmission to go forward in a step 308.

The collision detection unit 118 continues to monitor the transmission line during transmission of the data from the network device 102 in a step 312. If there is no collision, the transmission continues until the transmission is concluded in a step 314. If, however, in step 312, a collision had been determined to occur, the collision detection unit 118 continues the transmission briefly until other units have detected their transmissions. The collision detection unit 118 then prevents the transceiver 128 from continuing the transmission and determines how many devices have collided in a step 316. As discussed above, the determination of how many devices has collided is accomplished in one embodiment through a comparator 200 comparing the received voltage level with a predetermined voltage level and providing an indication of the comparison to a detection control unit 202. If there is only one other network device 104, 106 colliding with the transmission attempt by the network device 102, the collision detection unit 118 provides a collision signal to the shift register 208 and to the up/down counter 214, to select, for example, the backoff window corresponding with the first retransmission attempt (n=1) in a step 318. In a step 328, the collision detection unit 118 will determine the end of the backoff time and will attempt to retransmit, looping back to step 308.

If, however, in step 316 the collision detection unit 118 had determined that more than one other network device 104, 106 had attempted to transmit and had collided with the transmission attempt by the network device 102, the collision detection unit 118 would provide an indication of how many devices had collided in a step 320. As discussed above, this includes, for example, a monitoring of voltage levels on the transmission medium 108 with a higher voltage level being detected for more devices attempting to transmit simultaneously on the bus. In another embodiment, the comparator 200 includes an edge detector, and a first pulse characteristic (i.e., a first pulse width or predetermined number of edges) corresponds to a first number of devices colliding; a second pulse characteristic corresponds to a second number of devices colliding.

The detection control unit 202 of the collision detection unit 118 then provides a control signal to the shift register 208 indicative of a greater number of colliding devices on the transmission medium 108. For example, if two other devices have collided with the device 102, two clock signals causing two shifts may be provided to the shift register 208 in a step 322. Thus, a greater number of potential backoff windows are selectable.

When the designated backoff window expires, the network device 102 will again attempt to transmit on the bus. If the bus is free, the network device will succeed in its transmission in a step 314.

The invention described in the above detailed description is not intended to be limited to the specific form set forth herein but on the contrary, it is intended to cover such alternatives, modifications and equivalents as can reasonably be included within the spirit and scope of the appended claims.

What is claimed is:

1. A method for improving access to a transmission medium in a network system, comprising:

a first node detecting a transmission collision and determining if said transmission collision is with more than one other node; and said first node selecting a backoff window having a duration of r multiples of a predetermined backoff time, where r is a randomly distributed integer in the range:

$0 \leq r \leq 2^k$, where k=min (n, 10), and, for each retransmission attempt, where n is a number greater than a retransmission attempt number, responsive to said first node detecting said transmission collision with more than one other node, and where n is a number equal to a retransmission attempt number responsive to said first node detecting that said transmission collision is with one other node.

2. The method according to claim 1, further comprising others of said more than one other node selecting backoff windows having a duration of r multiples of a predetermined backoff time, where r is a randomly distributed integer in the range: $0 \leq r \leq 2^k$, where k=min (n, 10), and where n is a number greater than a retransmission attempt number, responsive to others detecting said transmission collision.

3. The method according to claim 1, further comprising said first node selecting a backoff window having a duration of r multiples of a predetermined backoff time, where r is a randomly distributed integer in the range: $0 \leq r \leq 2^k$, where k=min (m, 10), and where m is the retransmission attempt number, when said first node detects a single second node colliding with said first node.

4. The method according to claim 3, wherein said first node detecting said transmission collision with more than one other node comprises detecting a first voltage level on said transmission medium.

5. The method according to claim 4, wherein said first node detecting a single second node colliding with said first node comprises said first node detecting a second voltage level on said transmission medium.

6. The method according to claim 3, wherein said first node detecting said transmission collision with more than one other node comprises said first node detecting a first predetermined number of pulse signals on said transmission medium.

7. The method according to claim 4, wherein said first node detecting a single second node colliding with said first node comprises said first node detecting a second predetermined number of pulse signals on said transmission medium.

8. A network system, comprising:
   a bus;
   a first node coupled to said bus;
   a second node coupled to said bus; and
   a third node coupled to said bus, said third node being configured to detect transmission collisions between said third node and one or more of said first and second nodes and identify if a transmission collision is with one or more of said first and second nodes, and wherein said third node is configured to select first backoff windows according to a first method when said third node detects a transmission collision with one or the other of said first and second nodes, and said third node is configured to select second backoff windows according to a second method when said third node detects a transmission collision with both said first and second nodes.

9. The network system of claim 8, wherein said third node is configured to select first backoff windows having a duration of r multiples of a predetermined backoff time, where r is a randomly distributed integer in the range: $0 \leq r \leq 2^k$, where k=min (n, 10), and where n is a retransmission attempt number.

10. The network system of claim 9, wherein said third node is configured to select second backoff windows having a duration of r multiples of a predetermined backoff time, where r is a randomly distributed integer in the range: $0 \leq r \leq 2^k$, where k=min (n, 10), and where n is a number greater than a retransmission attempt number.

11. The network system of claim 10, wherein said third node is configured to detect a transmission collision with one or the other of said first and second nodes by detecting a first voltage level on said bus.

12. The network system of claim 11, wherein said third node is configured to detect a transmission collision with both of said first and second nodes by detecting a second voltage level on said bus.

13. The network system of claim 10, wherein said third node is configured to detect a transmission collision with one or the other of said first and second nodes by detecting a first predetermined pulse characteristic on said bus.

14. The network system of claim 11, wherein said third node is configured to detect a transmission collision with both of said first and second nodes by detecting a second predetermined pulse characteristic on said bus.

15. A computer network node in a network having a plurality of nodes coupled to a bus, comprising:
   a detecting unit for detecting a plurality of collisions of data packets at two or more of said plurality of nodes and identifying a number of nodes involved in a collision; and
   a control unit operably coupled to said detecting unit for controlling backoff windows when said collision is detected.

16. The computer network node of claim 15, wherein said control unit is configured to select a backoff window having a duration of r multiples of a predetermined backoff time, where r is a randomly distributed integer in the range: $0 \leq r \leq 2^k$, where k=min (p, m), where p is a number greater than a retransmission attempt number, and where m is a predetermined maximum number of retransmission attempts, responsive to said computer network node detecting said collisions of data packets between said computer network node and said at least two others of said plurality of nodes.

17. The computer network node of claim 16, wherein p is a number equal to a number of other nodes 104, 106 having data packets that have collided with data packets of said computer network node 102 prior to a successful transmission.

18. A computer network node in a network having a plurality of nodes coupled to a bus, comprising:
   a detecting unit for detecting a plurality of collisions of data packets at two or more of said plurality of nodes and identifying a number of nodes involved in said collision;
   a control unit operably coupled to said detecting unit for controlling backoff windows when a collision is detected, wherein said detecting unit is configured to monitor voltage levels on said bus, a first voltage level indicative of a collision between said computer network node and two or more of said plurality of nodes, a second voltage level indicative of a collision of data packets between said computer network node and one other of said plurality of nodes.

19. A computer network node in a network having a plurality of nodes coupled to a bus, comprising:
   a detecting unit for detecting a plurality of collisions of data packets at two or more of said plurality of nodes and identifying a number of nodes involved in said collision;
   a control unit operably coupled to said detecting unit for controlling backoff windows when a collision is detected, wherein said detecting unit is configured to monitor pulses on said bus, a first pulse characteristic indicative of a collision of data packets between said computer network node and said at least two others of said plurality of nodes, a second pulse characteristic indicative of a collision of data packets between said computer network node and one other of said plurality of nodes.

20. A computer network node in a network having a plurality of nodes coupled to a bus, comprising:

a detecting unit for detecting a plurality of collisions of data packets at two or more of said plurality of nodes and identifying a number of nodes involved in said collision;

a control unit operably coupled to said detecting unit for controlling backoff windows when a collision is detected, wherein said control unit is configured to select a backoff window having a duration of r multiples of a predetermined backoff time, where r is a randomly distributed integer in the range: $0 \leq r \leq 2^k$, where k=min (n,10), and where n is a number equal to a retransmission attempt number, responsive to said computer network node detecting a collision of data packets between said computer network node and said one other of said plurality of nodes.

21. The computer network node of claim 20, wherein said control unit 114 is configured to select a backoff window having a duration of r multiples of a predetermined backoff time, where r is a randomly distributed integer in the range: $0 \leq r \leq 2^k$, where k=min (p, m), where p is a number greater than a retransmission attempt number, and m is a predetermined maximum, responsive to said computer network node 102 detecting said collisions of data packets between said computer network node 102 and said at least two others of said plurality of nodes 104, 106.

22. The computer network node of claim 21, wherein n=p when a collision involving one other computer network node follows a collision involving data packets of more than one computer network node.

23. The computer network node of claim 21, wherein n=p when a collision involving one other computer network node 104 precedes a collision involving data packets of more than one other computer network node 104, 106.

* * * * *